United States Patent [19]

Reynolds

[11] 4,182,308

[45] Jan. 8, 1980

[54] SOLAR ENERGY COLLECTOR

[75] Inventor: James E. Reynolds, Golden, Colo.

[73] Assignee: Hazen Research, Inc., Golden, Colo.

[21] Appl. No.: 849,026

[22] Filed: Nov. 7, 1977

[51] Int. Cl.$^2$ .................................................. F24J 3/02
[52] U.S. Cl. .................................... 126/437; 165/171
[58] Field of Search ............... 126/270, 271; 237/1 A; 165/48, 49, 171, 172, 173

[56] References Cited

U.S. PATENT DOCUMENTS

| 3,908,631 | 9/1975 | Rom | 126/270 |
| 3,987,783 | 10/1976 | Powell | 126/271 |
| 4,015,586 | 4/1977 | Vroom et al. | 126/271 |
| 4,018,213 | 4/1977 | Mann, Jr. | 126/271 |
| 4,036,209 | 7/1977 | Press | 126/271 |
| 4,082,082 | 4/1978 | Harvey | 126/271 |
| 4,085,734 | 4/1978 | Gibbs | 126/271 |
| 4,091,800 | 5/1978 | Fletcher et al. | 126/271 |

FOREIGN PATENT DOCUMENTS

| 2335804 | 7/1977 | France | 126/271 |
| 1157156 | 7/1969 | United Kingdom | 126/271 |

Primary Examiner—James C. Yeung
Attorney, Agent, or Firm—Sheridan, Ross, Fields & McIntosh

[57] ABSTRACT

A solar energy collector which is inexpensive to manufacture and install comprising a heat absorber unit of rubber-like material having channels for the passage therethrough of heat exchange fluid and spaced-apart retainer means on its top for retaining a flexible solar collector cover in a flexed configuration accomplished by wedging it between the retainer means so that the area of the insulating space between absorber and collector can be controlled for different climates by spacing the retainer means and a simple means for assembling absorber and collector is provided. The collector is adapted to be mounted on a base to form a modular unit.

18 Claims, 6 Drawing Figures

SOLAR ENERGY COLLECTOR

BACKGROUND OF THE INVENTION

The widespread interest evidenced by both government and industry today in developing an economical solar energy collection system for residential heating is well known. Substantial effort is being expended to develop such a system, including systems for hot water heating. The two main items of expense wherein improvements are necessary are in the initial manufacturing cost of the solar collector system and the installation cost.

Solar energy for supplemental hot water heating and home heating awaits the development of a reliable, reasonably efficient, inexpensive solar collector. Present commercial units cost $10–15/ft$^2$ for the collector and about $20/ft$^2$ for the total installed cost, including plumbing, storage, heat exchange, and the control system. A typical home requires about 50–75 square feet for hot water heating, or $1000–1500 installed cost and one-third the heated floor space for forty percent supplemental space heating, e.g., $\frac{1}{3} \times 1500$ ft$^2$ home=500×20=$10,000.

Obviously, few home owners are willing to invest this amount of money for a 10–15 year payback in fuel savings in view of the uncertainties of the energy situation, alternate approaches to reducing home heating costs such as insulation, and reports of the unreliability and lower than expected thermal efficiencies of some commercial solar units.

Accordingly, it is a principal object of this invention to provide a solar energy collector which can be manufactured from inexpensive materials by relatively inexpensive mass production techniques, and which can be readily installed by the home owner.

It is another object of this invention to provide a solar energy collector comprised of solar energy collector cover and heat absorber which can be readily assembled by the home owner simply by bowing the flexible collector cover for insertion between retainer elements attached to the heat absorber to persent a convex curved surface of the collector cover exposed to the sunlight, provide a weather tight seal between collector cover and heat absorber, and provide a means for adjusting the area of the insulating air space between collector cover and heat absorber.

SUMMARY OF THE INVENTION

The invention is a solar energy collector comprising a solar energy collector cover and a heat absorber. The solar energy collector may optionally be mounted on a base to provide a module. The collector cover is made of a spectrally transparent material, preferably, of fiberglass reinforced polyester and the heat absorber is made of a rubber-like material such as "HYPALON" or chlorobutyl rubber, these materials being relatively inexpensive. The heat absorber is constructed of two plies of material and channels for circulation of heat exchange fluid are made therein by welding (thermal, adhesive or otherwise) spaced-apart narrow strips so that tubular areas are left between the strips. The tubular areas communicate at the ends of the heat absorber by spaces which are made by leaving unwelded portions at the ends of the alternate welded strips. The top of the heat absorber is provided with cover retaining means comprised of longitudinal holding strips or flaps which are spaced apart a distance on the heat absorber determined by the area of the heat absorber desired to be covered by the solar energy collector cover. Transverse distance between the retainer strips or flaps is made less than the width of the collector cover so that the flexible collector cover must be bent or bowed for insertion of its edges between the retainer strips so that a curved convex upper surface of the collector cover is exposed to sunlight, a weather tight seal is provided between the collector cover and the heat absorber, and a means is provided for adjusting the distance between collector cover and heat absorber and thereby controlling the insulating space between collector and heat absorber for different climates. A suitable base may be provided to which the heat absorber is secured by an aluminum foil upper surface of the base. The base may be of laminated construction of insulating material, such as, wood. The ends and sides of the heat absorber are made of sufficient length to extend down over the base and be fastened there to provide a moisture proof structure to protect the base and insulation from moisture.

DESCRIPTION OF THE PREFERRED EMBODIMENTS

The invention will now be described with reference to the accompanying drawings. In the description and claims the terms "solar energy collector cover" and "heat absorber" will be used to indicate, respectively, the cover exposed to the sun through which solar energy is transmitted and the unit which receives the transmitted energy for transfer to the heat exchange fluid. The term "solar energy collector" or "solar collector" is used to indicate the combination of of the solar energy collector cover and the heat absorber. The term "base" designates the support upon which the solar energy collector is mounted to form a module.

Figure 1:
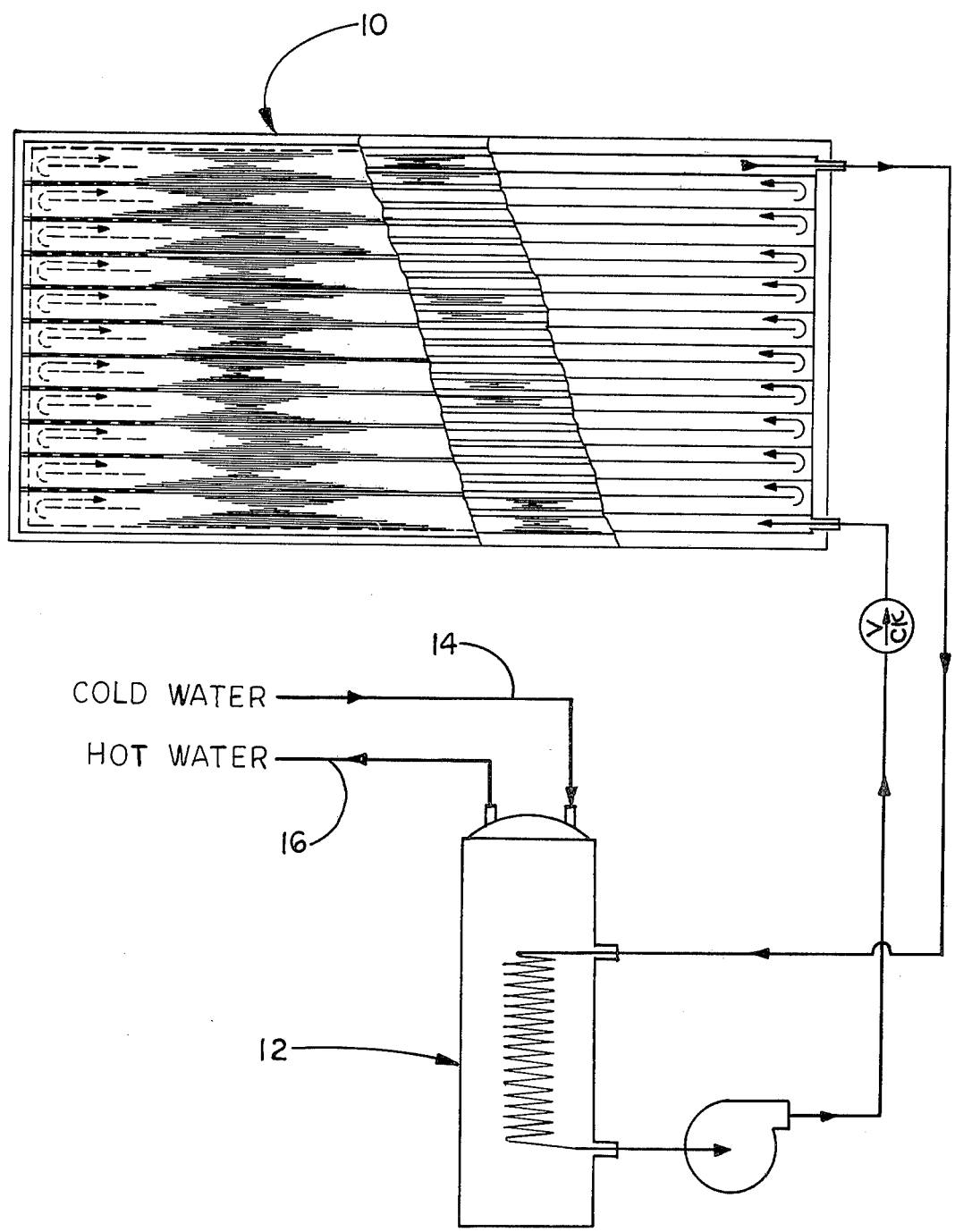
FIG. 1 is a schematic showing of a heating system for a building incorporating the solar collector of the invention.

Referring to FIG. 1, numeral 10 refers generally to the solar collector of the invention and the numeral 12 refers generally to a hot water tank for a residential heating system connected to the solar collector by means of cold water pipe 14 and hot water return pipe 16. It will be seen that cold water passes into the solar collector 10 where it circulates through the channels to be later described and after it has been heated, out through the hot water pipe 16 back to the hot water tank 12. The heated water can be used for various purposes.

Figure 2:
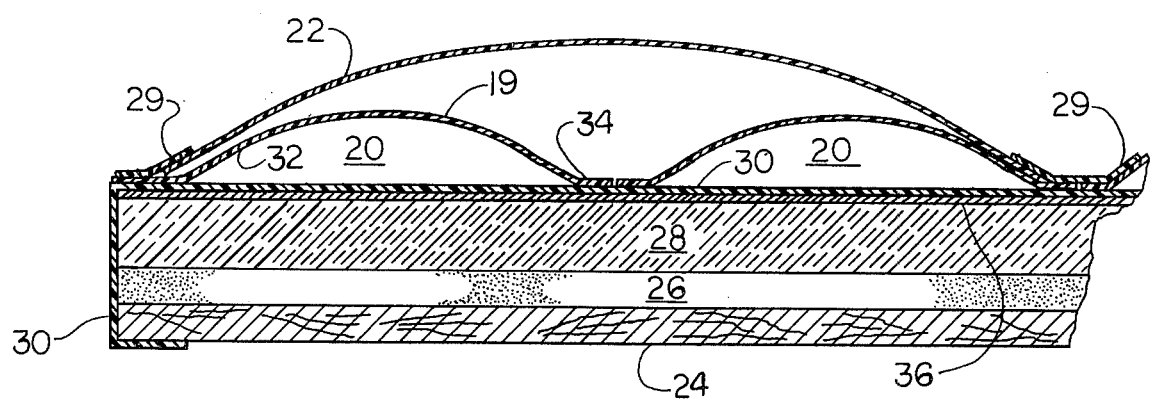
FIG. 2 is a cross-sectional view of the solar collector of the invention mounted on its base, the drawing being partially schematic.

For a more detailed description of the solar collector unit reference is made to FIG. 2. As shown therein, the solar collector comprises a base represented generally at 36 upon which is secured in a manner to be described later a heat absorber represented generally at 19 having flow channels 20 through which water to be heated passes as will be described hereinafter.

For collecting the sun's heat rays and transferring them to the absorber, a spectrally transparent collector cover 22 is mounted over the heat absorber 19 in a manner to be described later. As shown in FIG. 2, the collector assembly of heat absorber, and collector cover is mounted on a laminated base comprising outdoor plywood slab 24, dry wall slab 26 and Styrofoam insulator slab 28. The complete unit including the solar collector and the heat absorber mounted on the laminated base may be mounted on a roof or other support for the collection of heat rays. Other suitable structure may be used for mounting the solar collector unit comprising the cover and heat absorber where it will be exposed to sunlight.

The solar panels or collector covers 22 are preferably made of clear FRP polyester sheet specifically designed for solar panel covers and is sold by Kalwall Corporation, Manchester, New Hampshire under the trade name "Sun-Lite". It is an acrylic modified, highly light stabilized polyester which is reinforced with fiberglass. Other resin-rich fiberglass reinforced materials may be used for the collector units, such as fiberglass reinforced polyester sheet. The units 22 are preferably flexible and are secured at their longitudinal edges under longitudinally extending cover retainer flaps 29 which are secured to the heat absorber unit in a manner to be described later.

Figure 3:
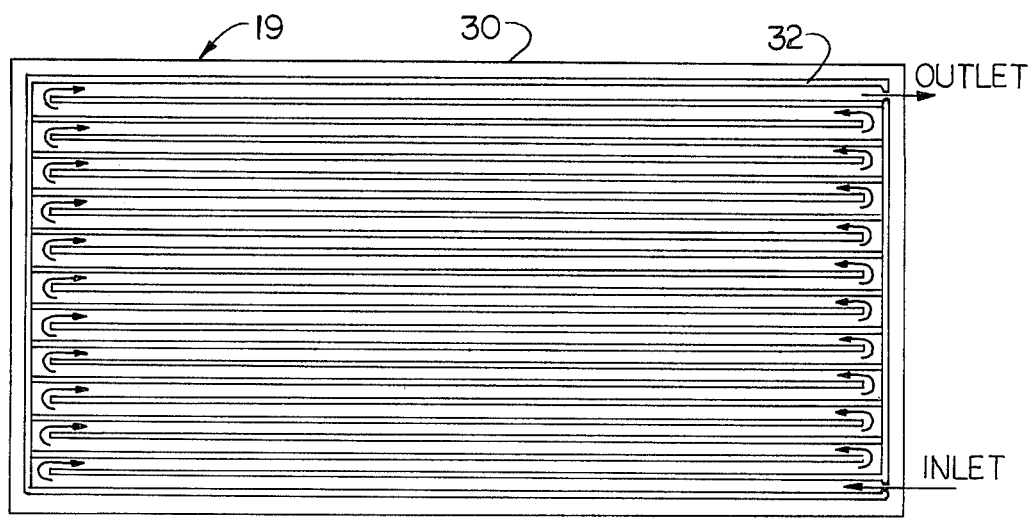
FIG. 3 is a plan view of a cross-section of the heat absorber unit of the solar collector.

Reference is now made to FIG. 3 for a more detailed description of the absorber unit 19. The unit is constructed with a flat base or ply 30 to which is welded the upper ply 32 of the absorber unit. Each ply is of rectangular construction with sides and ends welded together at their edges. The heat absorber unit is fabricated by laminating two sheets of material together either by a thermal or adhesive bond to weld the plies together in an air mattress-type configuration. As shown in FIG. 2, the plies are welded together longitudinally at the point 34 (FIG. 2) where spaces are left at alternate ends of the weld seams to provide connecting conduits between the channels 20 formed by the welded seams as shown in FIG. 3. When water or other heat transfer fluid or air is flowed through the unit, the unwelded portions will rise to permit fluid to flow through the channels formed between the welded seams. The term "fluid" is used herein to mean liquid or gas. The bottom 30 is attached to the laminated base (FIG. 2) by welding or otherwise. Preferably, an aluminum foil 36 is secured on top of Styrofoam sheet 28 to which heat absorber unit 19 is secured. The absorber unit is secured over the Styrofoam insulation 28 and the ends and sides of the bottom ply 30 folded down around the insulation and base to seal the edges of the base from moisture penetration. The absorber unit also has adjacent oppositely extending resilient retainer flaps 29 (FIG. 2) attached along the length of the alternate flow channels. The flaps are for securing the longitudinal edges of the solar collector cover 22. These collector covers are wider than the distance between retainer flaps and are bowed for insertion to provide a tight fit under the retainer flaps. This also provides an air gap above the absorber for insulation. There is enough flex in the material of the collector cover units and resilience in the retainer strips to provide a good weather-tight gasket-type seal between the edges of the cover and the retainer flaps.

The absorber unit, including the base, is made of reinforced "Hypalon", a material available on the market and which is described in U. S. Pat. No. 2,046,090. Other rubber-like material capable of holding up to 140° F. water and sunlight for at least ten years may be used. Other elastomeric or plastic-type materials which may be used but which are not as satisfactory include carbon black-filled polyethylene and polyvinylchloride; however the service life of these two latter materials is too short. Other materials which may be used for the collector cover are acrylics and polyvinylfluoride.

Figure 4:
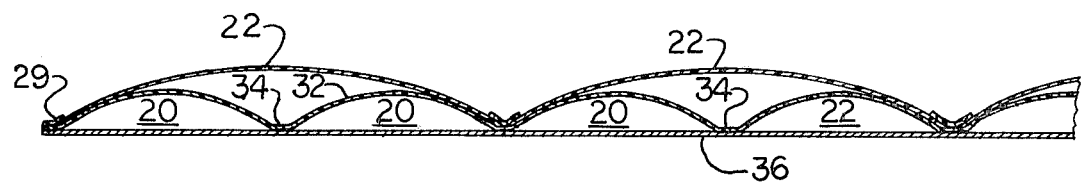
FIG. 4 is a transverse cross-sectional view of an assembled solar collector with the collector covers each covering two channels of the heat absorber.
Figure 5:
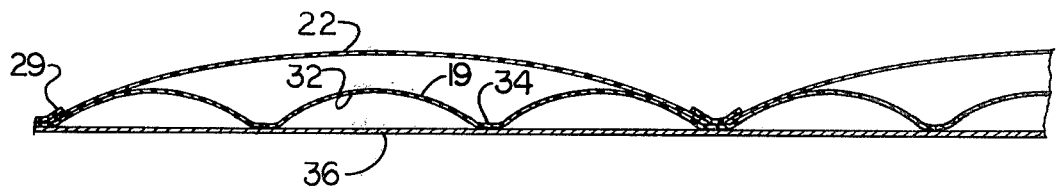
FIG. 5 is a transverse cross-sectional view like that of FIG. 4 showing collector covers each covering three channels of the heat absorber.
Figure 6:
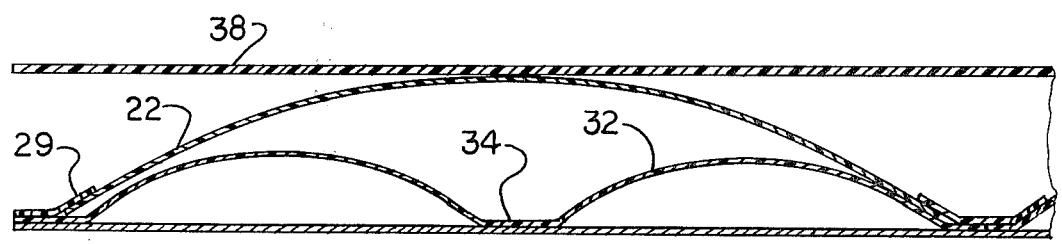
FIG. 6 is a cross-sectional view of a modification of the solar collector of the invention.

In the modification shown in FIG. 4 a collector cover is mounted over each adjacent pair of absorber channels while FIG. 5 shows a modification in which a collector cover is mounted over each group of three channels. Of course, this construction is optional as the number of channels covered by a collector cover can vary depending upon the size of the unit. A futher modification is shown in FIG. 6 in which a flat collector cover 38 is mounted over the collector covers 22. This construction has been found suitable for some applications. The collector cover sheet 38 is of the same material as the collector cover 22. The preferred material of the collector cover of the described modification is referred to herein and in the claims as an acrylic modified, fiberglass reinforced polyester. This material has been found to have suitable solar collector properties such as solar energy transmission, and resistance to thermal degradation, surface erosion, thermal shock and damage from impact. "Sun-Lite" is an example of a suitable fiberglass reinforced polyester which may be used as solar collector cover material.

The heat absorber unit of the described modification is fabricated by laminating two sheets of Hypalon together using dielectric heating to weld the plies together along narrow strips or lines in air mattress-type configuration. The retainer strips are made integral with the heat absorber by attaching one inch wide strip of Hypalon along a length of alternate flow channels and leaving a one-fourth flap on each side unattached for securing the solar energy collector cover. This method of manufacture is easily adaptable to assembly line production.

As stated previously, the fiberglass reinforced polyester known as "Sun-Lite" meets the spectral, structural and other properties required of material for a solar energy collector cover. Because of the high impact resistance and strength of this material, compared to glass, much thinner sheets can be used for collector covers. This, coupled with the lower density of this material results in a reduction in shipping weight and ease in handling and in assembly. Obviously, the care required in handling glass panels to avoid breakage is not necessary. A comparison of the manufacturing cost and handling cost of this material with glass is very favorable in favor of the Sun-Lite material.

The panel for a particular unit is cut to a required size to give the necessary area of insulating space between the cover and the heat absorber for different climates. The width of the cover panel will, of course, be greater than the distance between the retaining means on the top of the heat absorber. The cover is then inserted by flexing it outwardly and inserting its edges in the spaced-apart retainer means. It is obvious from the description that the distance between the cover and the top of the absorber unit, and therefore the area of the insulating air space, can be adjusted by adjusting the width of the cover. It will be seen that the method of inserting the cover securely over the heat absorber after the materials have been shipped to the owner is simple enough to permit installation by the owner.

A series of the outwardly curved collector covers gives a scalloped appearance which is esthetic and does not give the appearance of a greenhouse roof. The curved plastic covers are structurally superior to flat panes, for example, of glass. The impact resistance of the material of the cover plates provides protection from damage by hail or vandalism. The curved covers provide a cellular-type cover which is effective in breaking convection currents and reducing heat loss. Holes in the collector surface can be readily repaired with a plastic material patching kit.

The laminated base which has been described can be purchased commercially under the trade name of "INSULWALL". However, it can be readily manufactured by assembly line production. After the base has been cut to the correct size, the top layer of Styrofoam is covered with aluminum foil and the absorber unit is bonded to the aluminum foil with a conventional bonding material for rubber-like material and aluminum. Edges are left extending from the heat absorber which are folded down around the ends and sides of the laminated base and secured thereto to provide a moisture proof barrier. The completed modules can be custom made and sold for installation by the home owner. They can be made flexible by modification of the base and insulation material so that they will fit a curved roof or other complex structures.

It can be seen from the above description that all of the parts of the module can be constructed inexpensively by mass production techniques and readily assembled at low cost for shipment to the homeowner. The unit can be readily installed by the homeowner. The collector modules are portable so they can be taken with the home owner if he moves. Because of the low volume of heat exchange liquid, usually water or a water solution, which is exposed to the atmosphere, less antifreeze is required to keep the liquid from freezing. The aluminum foil over the Styrofoam extends the life of the rubber-like surfaces of the heat absorber. The solar energy collector unit as well as the modular unit with the base can be custom made to any length or width requested. The configuration of the components is such that they can be shipped in flat form thus reducing shipment costs.

It is seen from the above description that a solar energy collector system has been provided which can be manufactured inexpensively with inexpensive materials by mass production techniques, and which can be installed cheaply by the home owner. Reliable estimates show that the assembly can be fabricated for a total of $3.23 per square foot so that two hot water collector modules would cost $206.72 as compared to $768 for two commercial models of comparable efficiency.

What is claimed is:

1. A solar energy collector for collecting and utilizing solar energy comprising:
   (a) at least one heat absorber including upper and lower plies sealed together along spaced apart narrow longitudinal lines to provide channels between said lines for passage of heat transfer fluids therethrough, said channels being connected at their alternate ends by spaces formed by alternate ends of adjacent lines being left unsealed;
   (b) at least one curved solar energy collector cover mounted over the top of said heat absorber with its upper convex surface facing outwardly and
   (c) retainer means secured to the top of said heat absorber for receiving longitudinal edges of said solar collector cover to retain said solar collector cover in operative position over said heat absorber, said retainer means includes a flap-like strip of resilient material secured along one of said narrow longitudinal lines.

2. The solar collector of claim 1 in combination with a heating system including means for circulating a heat exchange fluid from said system through said channels for absorbing heat from the heat absorber and back to said system where said heat is utilized.

3. The solar collector of claim 1 in combination with a base having a heat insulator top surface and the bottom of said heat absorber being attached to said top surface.

4. The solar collector of claim 3 in which said heat insulator top surface is made of foamed plastic.

5. The solar collector of claim 4 in which said foamed plastic is Styrofoam.

6. The solar collector of claim 5 in which said top surface is mounted on a rigid support element.

7. The solar collector of claim 6 in which said rigid support element is comprised of a slab of Styrofoam laminated to a slab of drywall and a slab of plywood laminated to said drywall slab.

8. The solar collector of claim 3 in which the ends of said heat absorber are extended over the ends of said base and secured to provide a moisture barrier for the ends of said base.

9. The solar collector of claim 1 in which said retainer means consists of two flap-like strips of resilient material secured along one of said narrow longitudinal lines extending laterally in opposite directions for receiving edges of adjacent solar collector covers.

10. The solar collector of claim 9 in which one of said retainer means is secured along alternate ones of said narrow transverse lines.

11. The solar collector of claim 1 in which said collector cover is made of fiberglass reinforced polyester.

12. The solar collector of claim 11 in which the polyester is acrylic modified.

13. The solar collector of claim 1 in which said solar collector cover is flexible and wherein said retainer means is spaced apart, the distance between said spaced apart retainer means being less than the width of said solar collector cover, whereby the latter must be bowed for insertion into position between said spaced apart retainer means so that the upper surface of said solar collector cover exposed to sunlight is curved and the solar collector cover is secured tightly between said spaced apart retainer means.

14. The solar collector of claim 13 in which the distance between said spaced-apart retainer means is adjusted to provide an optimum space between the inner surface of said solar collector cover and the top surface of said heat absorber.

15. The solar collector of claim 14 in which said distance is between about one-half to two inches.

16. The solar collector of claim 1 in which a solar collector cover is mounted over each pair of said channels.

17. The solar collector of claim 1 in which a solar collector cover is mounted over each group of four of said channels.

18. The solar collector of claim 1 in which a flat plate made of the same material as said solar collector cover is mounted over the top of said solar collector cover.

* * * * *